UNITED STATES PATENT OFFICE.

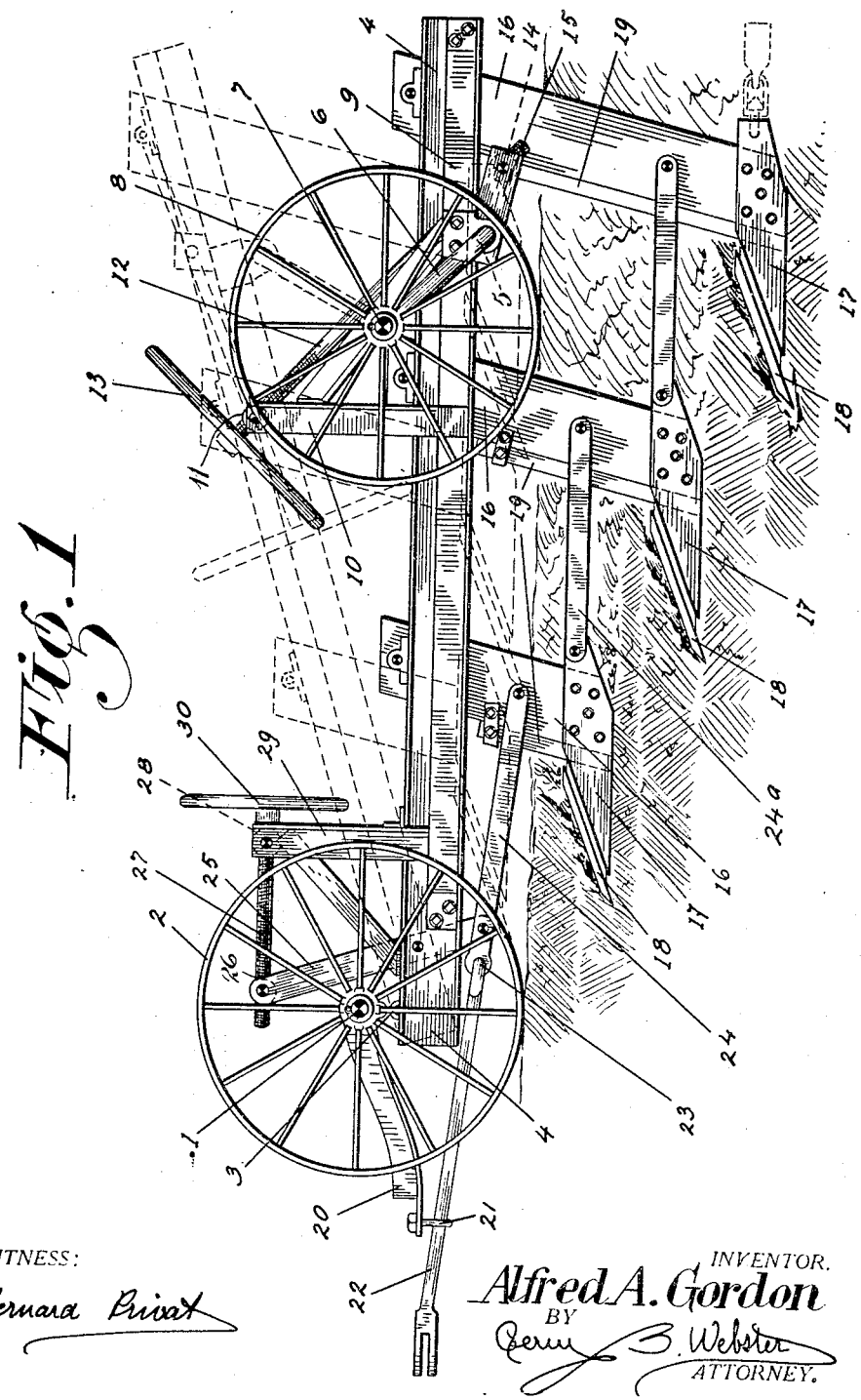

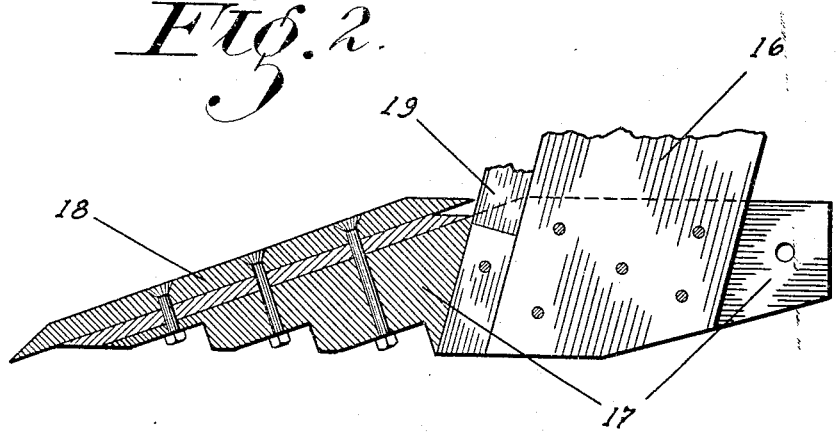
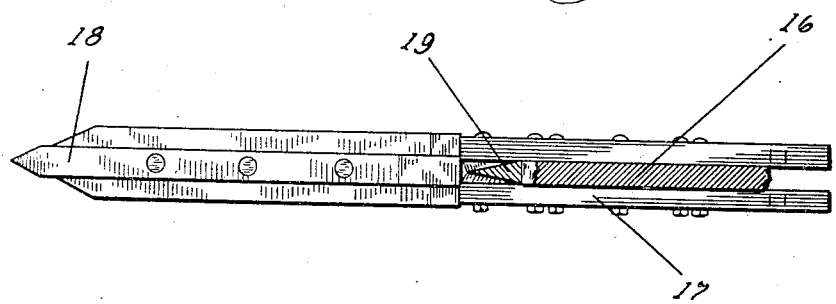

ALFRED A. GORDON, OF STOCKTON, CALIFORNIA, ASSIGNOR TO SARAH J. GORDON, OF PROVIDENCE, RHODE ISLAND.

SUBSOIL-PLOW.

1,287,291.      Specification of Letters Patent.      Patented Dec. 10, 1918.

Application filed June 18, 1917. Serial No. 175,312.

*To all whom it may concern:*

Be it known that I, ALFRED A. GORDON, a citizen of the United States, residing at Stockton, in the county of San Joaquin, State of California, have invented certain new and useful Improvements in Subsoil-Plows; and I do declare the following to be a full, clear, and exact description of the same, reference being had to the accompanying drawings, and to the characters of reference marked thereon, which form a part of this application.

This invention relates to improvements in sub surface plows and particularly to that type used for breaking up hard pan, clay, adobe and other hard and resistant soil formations. This class of land cannot be successfully handled for the planting of trees and the like until it is broken up and this is now being done largely by the use of dynamite and other explosives. This method is very expensive and also to a large degree very inefficient. There also have been efforts made toward using a sub soil plow consisting of a beam mounted on rear wheels and carrying a rigid standard dropped down to a depth at which it is desired to work the earth. This also has been found inefficient for the reason that it had no adjustment means for the plow and also it is very hard to get such a plow in and out of the earth. The shearing and tearing strain on the rigid standard is likewise very great. It is to overcome these objections that I have devised my improved sub surface plow. The object of my invention is to first provide a supporting frame mounted on rear and fore wheels so as to maintain the supporting frame always in the same plane. I then suspend a set of pivoted standards on this frame, the same being relatively stepped off at longer lengths from the front to the rear of the plow. I provide these standards with of the plow. I provide these standards with a flexible draft means likewise stepped off to gradually increasing depths so the entire draft of the plow is equalized along its length so that each standard will have an individual draft at a depth relatively near the sphere of operation of the plow share. In connection with the foregoing arrangement of plow standards and draft means I provide means for raising the standards from the ground and at the same time changing the relative position of the same so that the plow shares may be kept at the desired angle to perform efficient work. By this latter means the depth at which the plows may be operated can be varied at will, and also simultaneously therewith adjusted to cut at the correct angle and so that each plow share will cut the same relative proportion of the earth.

I aim by the above means to be able to utilize a minimum amount of power necessary to drag the plow through the earth and likewise to reduce the resistance of the earth against the plow as a whole to a minimum.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side elevation of the complete device as it appears when in operation.

Fig. 2 is a sectional view of the wedge shaped splitting point.

Fig. 3 is a top plan view of the same.

Referring now more particularly to the characters of reference on the drawings I first provide a fore axle 1 on which are mounted fore wheels 2. Pivotally mounted to the axle 1, as at 3 is the main supporting beam 4 of the device turnably journaled in the rear end of which is the rear axle 5. This rear axle 5 at its ends is provided with right angled portions 6 which terminate in spindles 7 and on which are mounted the rear wheels 8. Fixed to the beam 4 is an auxiliary frame 9 mounted upwardly from which is a post 10. Swiveled in the top of the post 10 is a block 11 turnable through which is a rod 12 having on its upper end an operating wheel 13. The lower end of the rod 12 threads through a block 14 swiveled in arms 15 fixed to the shaft 5. By turning the wheel 13 this in turn moves the rod 12 and advances it through the block 14. This action draws on the arms 15 and turns the shaft 5 which moves the right angle portions 6 from their normal horizontal position to their vertical position. This action elevates the lower end of the beam 4 and frame 9 for the purpose of lifting the plows from the ground in the manner as will presently appear.

Pivoted along the length of the beam 4 are a plurality of plow standards 16 which gradually increase in length toward the rear of the device in a step by step relation. When these plow standards 16 are mounted on the beam 4 they normally incline slightly from the top to the bottom toward the front of the device and at their lower ends are provided with wedge shaped plows 17 carrying plow points 18. Along the front edge of the standards 16 for a distance equal to the distance which said standards will project into the ground are provided sharp edged bars 19 to aid in cutting through the ground. The steering strut 20 of the device is mounted on the front axle 1 and at its front end is provided with a clevis 21. The draw bar 22 projects through this clevis 21 and at its rear end is hinged as at 23 to a draft link 24 which connects with the foremost of the plow standards 16 just above the plow 18. A similar draft link 24$^a$ connects the lower end of each standard 16 with the next succeeding standard to the rear and at a point just above the plow 18. From this it will be seen that the plows drop to lower depths one behind the other in a step by step relation and the draft for each plow is likewise dropped in the same relative degree. The forward end of the link 24 is connected to a lever 25 fulcrumed on the beam 4, in the upper end of which is swiveled a block 26. Threaded through the block 26 is a rod 27 turnable through a block 28 swiveled in a post 29 mounted on the beam 4. The rod 27 is provided with an operating wheel 30 at its end.

By turning the wheel 30 this advances the threaded rod 27 through the block 26 and moves the lever 25 in one direction or the other. Thus through the medium of the links 24 and 24$^a$ this changes the pitch of the standards 16 and consequently the pitch of the plows 18. Thus by operating the wheel 13 the beam 4 may be raised or lowered to set the plows so they will work at the desired depth and the operation of the wheel 30 adjusts such plows at the proper pitch desired for operating at that depth.

By having the plows arranged in step by step relation the foremost one cuts through a desired depth of the soil and breaks it up. The next succeeding plow has then only a corresponding depth to break up. So on, down the plows for as many as are desired to reach the proper depth. Since the plow in front breaks the soil above it the next succeeding plow has loose dirt to move through, save and except, that portion of the earth that it is to cut through. Thus although the soil may be broken up to a depth of several feet no one plow is required to cut more than a desired proportion thereof. This reduces the strain on the plows and standards to such a minimum as may be controlled by merely setting the plows to cut at desired depths.

I also wish to lay great stress upon my wedge shaped plows and their position well forward of the standards. There is now one plow in use which has a single rigid standard and a short bunty plow on the end which does not project more than a foot in advance of the standard. This plow is required to cut the full thickness of the earth between the surface and the depth to be cut. Since it is very short this throws the greatest part of the breaking strain on the standard and instead of splitting or wedging the earth into a broken condition as my plows do the standard simply tears through the same and consequently encounters a great resistance which requires a great deal of motive power to overcome. Also the same structure tends to jump the plow out of the earth and renders it very hard to start the same into the earth. By means of my improved step by step arrangement for the plows and the adjustment for gradually lowering and raising them and altering the pitch in a corresponding manner this allows me to work into the earth gradually and to easily withdraw therefrom. Also I am enabled to cut easily at any desired depth and, in soils of varying toughness, I can cut in the same in lesser or greater layers as is found desirable.

While I have shown but one specific form of connecting draft links for the plow standards it is evident that these may be varied at will and connected at different points as found most adaptable in practice.

Another great advantage which I claim for my plow over those in use is the fact that I mount the same with rear and fore wheels. This prevents the plow beam from having any tendency toward an oscillating movement which renders the operation of the plow very uncertain and also is very hard on the tractors used to pull the same due to the continual banging up and down of such plow beam.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A subsoil plow comprising a support, a plurality of standards pivotally mounted on the support in tandem, plowing devices on the standards, the standards increasing in length from the front to the rear of the device whereby each succeeding plowing device will cut to a greater depth than the preceding one, and means for moving all of the standards on their pivotal points at one time to alter the relative cutting depths of the plowing devices.

2. A subsoil plow comprising a support, a plurality of standards pivotally mounted on the support in tandem, plowing devices on the standards, the standards increasing in length from the front to the rear of the device whereby each succeeding plowing device will cut to a greater depth than the preceding one, means for moving all of the standards on their pivotal points at one time to alter the relative cutting depths of the plowing devices, such means including links connecting the standards, a lever fulcrumed on the support, a link connecting the lever to one of the standards and means for operating the lever.

3. A subsoil plow comprising a support, a plurality of standards of varying length pivotally mounted on the support and arranged one behind the other, plowing devices mounted on the lower ends of the standards, a link pivotally connected with each plowing device and to the next succeeding standard, and a draft bar connected with the foremost standard.

4. A subsoil plow comprising a support, a plurality of standards pivotally mounted on the support in tandem, plowing devices on the standards, the standards increasing in length from the front to the rear of the device whereby each succeeding plowing device will cut to a greater depth than the preceding one, means for moving all of the standards on their pivotal points at one time to alter the relative cutting depths of the plowing devices, and means for maintaining the same pitch of the plowing devices relative to the ground irrespective of their vertical positions.

In testimony whereof I affix my signature.

ALFRED A. GORDON.

Copies of this patent may be obtained for five cents each, by addressing the "Commissioner of Patents, Washington, D. C."